United States Patent [19]

Matthews et al.

[11] Patent Number: 4,663,170
[45] Date of Patent: * May 5, 1987

[54] FAT COATED MEAT BASED PRODUCTS

[75] Inventors: Bernard T. Matthews, Norwich; Alan J. Benstead, Aylesham; David J. Joll, Reepham; Sidney Thorp, Swanton Morley; David N. Wilson, Hellesdon, all of England

[73] Assignee: Bernard Matthews plc, Norfolk, England

[*] Notice: The portion of the term of this patent subsequent to Oct. 4, 2000 has been disclaimed.

[21] Appl. No.: 589,056

[22] Filed: Mar. 15, 1984

Related U.S. Application Data

[63] Continuation of Ser. No. 226,836, Jan. 21, 1981, abandoned, which is a continuation-in-part of Ser. No. 162,241, Jun. 23, 1980, Pat. No. 4,407,830, and a continuation-in-part of Ser. No. 88,353, Oct. 26, 1979, Pat. No. 4,473,592.

[30] Foreign Application Priority Data

Oct. 31, 1978 [GB] United Kingdom ............... 42591/78
Jun. 28, 1979 [GB] United Kingdom ................ 7922452

[51] Int. Cl.⁴ .............................................. A23L 1/31
[52] U.S. Cl. ........................................ 426/90; 426/92; 426/129; 426/641; 426/644
[58] Field of Search ................. 426/90, 92, 100, 129, 426/302, 307, 641, 644, 652, 393, 412, 513, 516, 517, 524, 105, 135, 138, 284, 413, 414, 415, 420, 518, 104, 272; 62/63, 64, 373, 374, 380, 431; 198/472, 795; 414/156; 425/131.1, 133.1; 17/35, 41; 138/118.1

[56] References Cited

U.S. PATENT DOCUMENTS

| | | | |
|---|---|---|---|
| 2,174,924 | 10/1939 | McCleary | 426/393 X |
| 2,868,650 | 1/1959 | Hammerberg | 426/393 X |
| 2,956,886 | 10/1960 | Baush | 426/393 |
| 3,399,423 | 9/1968 | Kielsmeier et al. | |
| 3,698,916 | 6/1970 | Moreland | |
| 3,864,503 | 2/1975 | Steenolsen | 426/412 X |
| 3,892,009 | 7/1975 | Townsend | |
| 4,210,677 | 7/1980 | Huffman | 426/513 X |
| 4,264,633 | 4/1981 | Bradshaw | 426/513 X |
| 4,407,830 | 10/1983 | Matthews et al. | 426/513 X |

FOREIGN PATENT DOCUMENTS

| | | |
|---|---|---|
| 932202 | 8/1973 | Canada . |
| 0004502 | 10/1979 | European Pat. Off. . |
| 0011402 | 5/1980 | European Pat. Off. . |
| 1692585 | 8/1971 | Fed. Rep. of Germany . |
| 2304799 | 8/1974 | Fed. Rep. of Germany . |
| 719270 | 12/1954 | United Kingdom . |
| 845028 | 8/1960 | United Kingdom . |
| 998410 | 7/1965 | United Kingdom . |
| 1001113 | 8/1965 | United Kingdom . |
| 1036016 | 7/1966 | United Kingdom . |
| 1163949 | 9/1969 | United Kingdom . |
| 1163948 | 9/1969 | United Kingdom . |
| 1201650 | 8/1970 | United Kingdom . |
| 1213929 | 11/1970 | United Kingdom . |
| 1227241 | 4/1971 | United Kingdom . |
| 1327762 | 8/1973 | United Kingdom . |

Primary Examiner—Arthur L. Corbin
Attorney, Agent, or Firm—Parkhurst & Oliff

[57] ABSTRACT

A meat-based product in accordance with the present invention comprises an elongate compacted constant cross section core of raw uncomminuted meat, an even and coherent annular coating of fluid fat material surrounding the core and an outer wrapping of flexible non-toxic sheet material, usually plastic, which retains the coating and remains on the product during cooking and is only removed immediately before eating.

17 Claims, 14 Drawing Figures

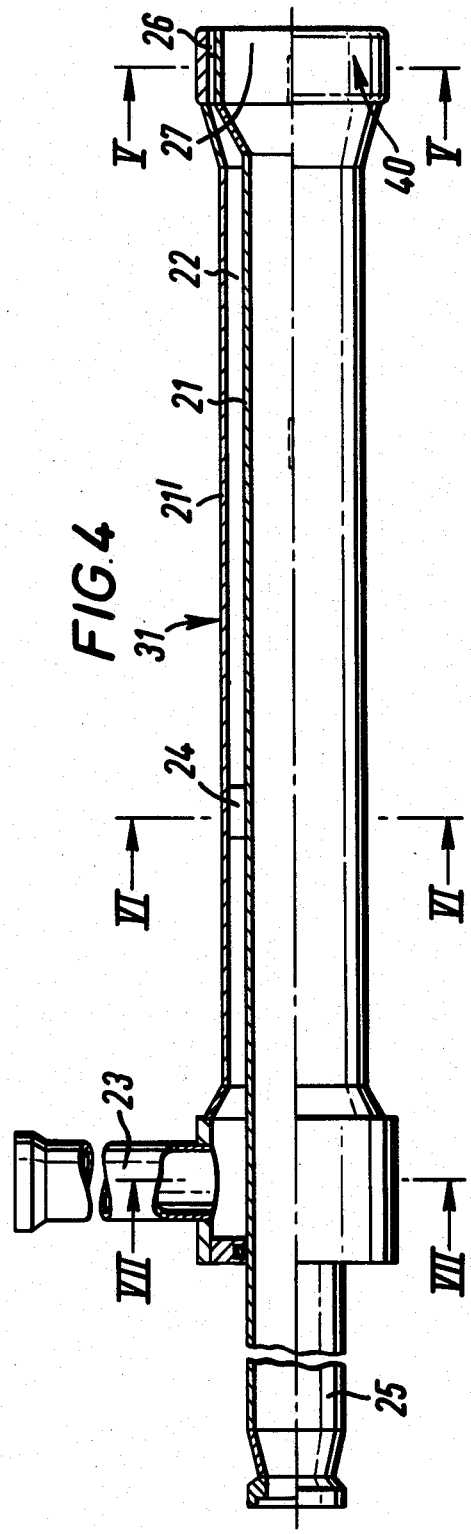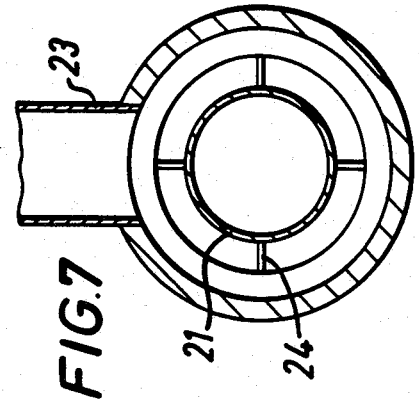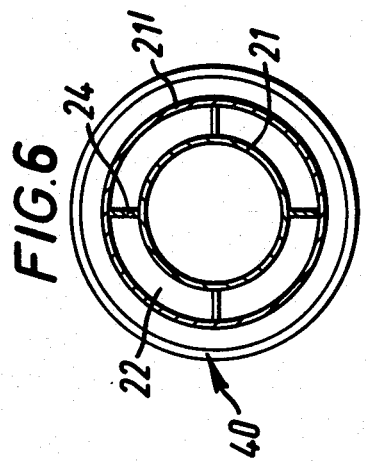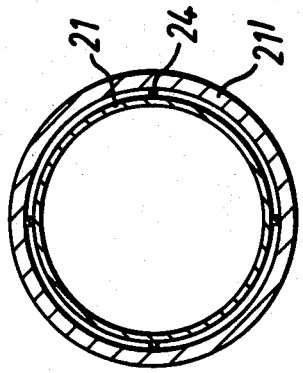

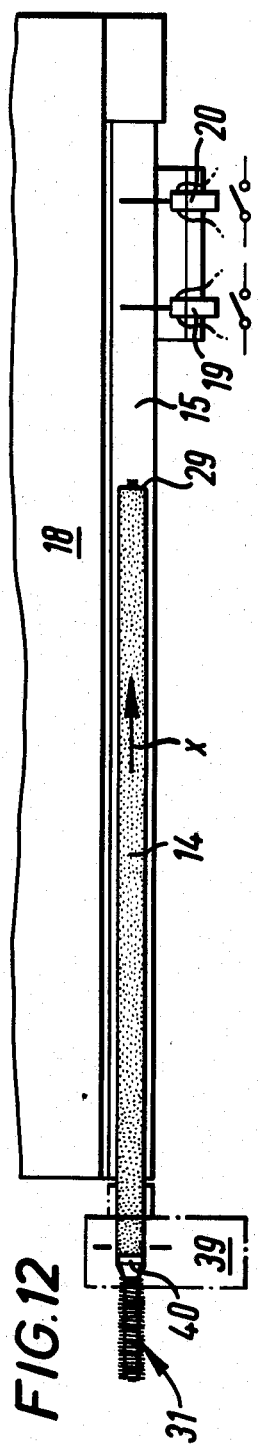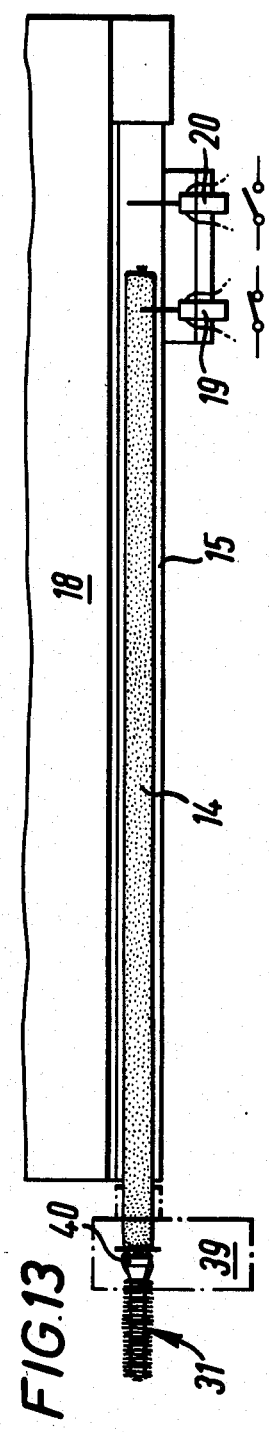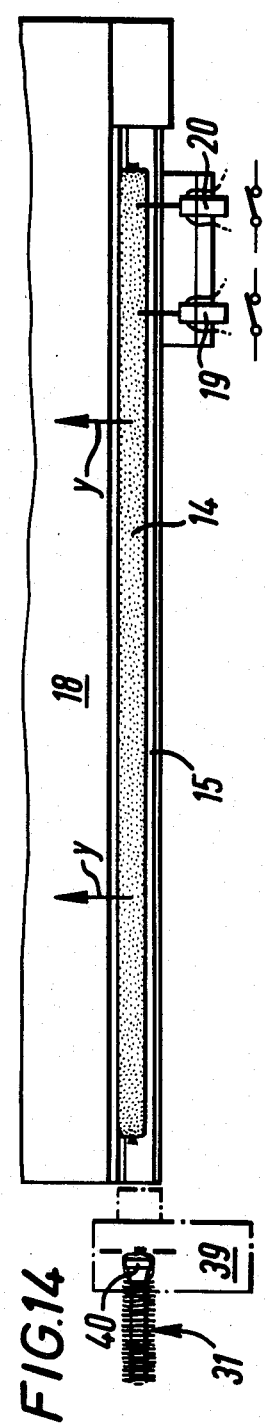

FAT COATED MEAT BASED PRODUCTS

CROSS REFERENCES TO RELATED APPLICATIONS

This is a continuation of application Ser. No. 226,836, filed Jan. 21, 1981, now abandoned, which in turn is a continuation in part of U.S. Ser. No. 162,241, filed June 23, 1980, U.S. Pat. No. 4,407,830, and U.S. Ser. No. 88,353, filed Oct. 26, 1979, U.S. Pat. No. 4,473,592.

SUMMARY OF THE INVENTION

This invention relates to a food product based on raw uncooked meat. It is at present envisaged that the product will be based on raw turkey meat and the invention will be specifically described with particular reference to turkey meat. It should be borne in mind however that the invention is, in principle, applicable to other meats.

It is the objective of the present invention to provide a boneless meat product which principally consists of naturally occurring solid fragments of meat (rather than the minced comminutes such as characterize hamburgers or sausage-type products) and an outer coating for enhancement of the product during cooking.

A meat-based product in accordance with the present invention comprises an elongate compacted constant cross section core of raw uncomminuted meat, an even and coherent annular coating of fluid material surrounding the core and an outer wrapping of flexible non-toxic sheet material, usually plastic, which retains the said coating and remains on the product during cooking and is only removed immediately before eating.

The invention thus provides a meat product prepared by a process which comprises the sequential steps of:
(1) forming the meat into a first elongate billet;
(2) freezing the thus formed first billet solid;
(3) forming a second elongate frozen billet similar to the first billet;
(4) driving the second frozen billet longitudinally into end-on abutting relationship with the first billet and continuing the said drive thereby longitudinally advancing the first billet;
(5) extruding a layer of a fluid fat onto the first frozen billet during the longitudinal advance;
(6) sheathing the fat-coated first billet with a protective plastic sleeve;
(7) superficially freezing the fat-coated, sheathed first billet to freeze the fat coating thereon, the billet being unsupported during the advance past the stations at which the said extruding, sheathing and superficial freezing steps are carried out, and
(8) cutting the thus coated and sheathed frozen first billet into a predetermined length,
to produce a frozen product having a core of meat of substantially constant cross-section, an outer coherent and substantially uniform coating of fat, and an overlying plastic sheath.

The fluid material will normally be fatty in character to provide a protective layer during cooking which prevents scorching of the meat. It is envisaged however instead of, or in addition to, the fatty material, to provide flavourings in the fluid material.

We have found that the necessary evenness and coherence of the annular coating can only be achieved by extruding the fluid material over the core and our copending patent applications Ser. No. 88,353 and 162,241 disclose two processes for doing this. The disclosures of these patent applications are incorporated by reference.

In broad aspect the process of patent application Ser. No. 88,353 (now U.S. Pat. No. 4,473,592) comprises extruding a cylindrical core of meat, freezing the core solid and thereafter extruding onto the solid core from a surrounding extruding device the fluid material with the plastic outer cover and immediately flash freezing the fat to preserve its integrity. patent application Ser. No. 162,241 (now U.S. Pat. No. 4,407,830) envisages a co-extrusion process wherein the core and the outer layer are extruded in their precise dimensions from the laterally enlarged head of an extrusion mandrel into an appropriately shaped casing which preserves these dimensions.

Two processes and apparatuses for producing a meat product in accordance with the invention will now be described by way of example and with reference to the accompanying drawings

BRIEF DESCRIPTION OF THE DRAWINGS

FIG. 4 is a side view partly in section of the extrusion mandrel of the apparatus of FIG. 1;

FIGS. 5, 6 and 7 are sections on the lines V—V, VI—VI and VII—VII of FIG. 4;

FIGS. 12, 13 and 14 are schematic plan views illustrating how a food product in the form of an elongate billet leaves the mandrel and is discharged into a freezing tank.

DESCRIPTION OF THE PREFERRED EMBODIMENTS

Figure 1:
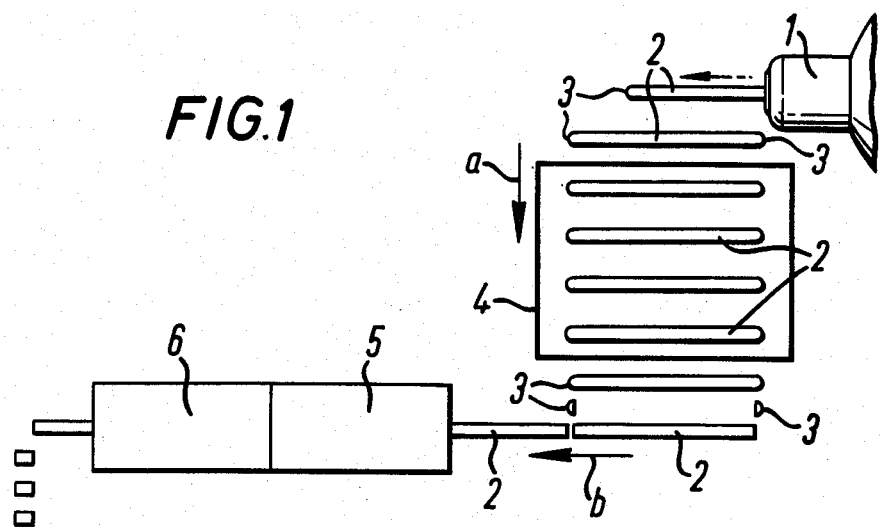
FIG. 1 is a diagrammatic representation of a first process and apparatus of the invention.

Oven-ready, i.e. plucked and cleaned but raw, turkey carcasses are manually deboned on a conveyor line to remove the skin and meat. The deboned raw meat is then mechanically massaged with salt to produce salt soluble proteins which enhance the binding properties of the meat. This preliminary process stage is not illustrated.

The meat is then extruded from a device 1 into a cylindrical billet 2 of substantial length typically 7 meters and typically 10 cm in diameter. The extrusion device wraps the billet in a plastic casing, which wrapping operation rounds the end parts 3 of the billet.

The wrapped billet then moves transversely of its length in the direction of arrow 'a' into and through a freezing device 4. The freezing device is a tank of brine (calcium chloride solution) and movement of the brine moves the billets. The movement of the brine may be controlled and assisted by providing a weir in the tank. During movement of the billets through the tank freezing brine is caused to rain on the billets. It will be appreciated that the billet has to be wrapped during this feezing operation to avoid contamination of the meat by the calcium chloride.

The billet 2 is extracted from the downstream end of the tank as a rigid frozen "log". The brine is then drained from the billet and the billet washed. The rounded end parts are cut off and the casing stripped from the billet.

The stripped right cylindrical frozen billet 2 is then delivered to a conveyor moving in the direction of the arrow 'b' which is at right angles to the direction of the arrow 'a' and is thus the axial direction of the billet. The conveyor is made of longitudinally spaced rollers, each roller being mounted for rotation about a generally horizontal axis.

Each roller is of concave form so as to define a track with a radius approximately corresponding to that of the billet. Each roller at the input part of the conveyor is mounted on an upstanding post. Some of the rollers will be idle but drive for the billets may be provided by driving selected rollers. Positive drive for the billets is usually required, however, and that is conveniently provided by a toothed wheel driven to rotate about a horizontal axis. The teeth successively dig into the peripheral surface of the billet thereby propelling the billet along the conveyor.

From the input end each billet moves into a coating device 5 which coats the billet with fatty emulsified material hereinafter referred to as fat, to a depth of approximately 6 mm. The coating device, in principle, comprises a housing defining a through passage for the billet, annular extrusion means surrounding the passage for coating the peripheral surface of the billet with liquid fat and means for fitting a protective sleeve over the fat-coated billet. Upper and lower concave drive rollers smooth the sleeve by applying constant pressure to the liquid fat trapped between the sleeve and the billet. Preferably the sleeve is of heat shrinkable plastic material and a heat shrinking operation is carried out immediately after the fitting of the sleeve. The heat shrinking ensures the evenness and coherence of the fat coating and the tight and secure fit of the sleeve.

The fat coated and sleeved billet is moved along the conveyor into a freezing device 6 for superficially freezing the fat coating. This device is conveniently a liquid nitrogen freezer and will hereinafter be described as such. After some eighteen inches travel through the freezer the fat hardens sufficiently to allow support by a roller of a conveying device without marking the billet. Typically the liquid nitrogen freezer is of the order of 10 ft. long and contains a conveyor device comprising longitudinally spaced rollers as described above.

It should be noted that the billet must extend unsupported between entry to the extrusion device and engagement by the first roller in the nitrogen freezer. This makes long billets necessary. Typically the spacing between conveyor elements will be of the order of a few feet, say 3 ft.

After emergence from the nitrogen freezer the billet is cut to the commercially desirable lengths, say 72 to 75 millimeters. This cutting is preferably by a reciprocating saw blade.

In order to freeze the fat coating within an economic length of nitrogen freezer a slow speed of billet advance is necessary. However, slow speeds mean slow product output, and in order to reconcile effectiveness with economy it is proposed to run two or more conveyors in parallel each through a fat coating device and a nitrogen freezer. In such a system it is proposed to provide a plurality of reciprocating saw blades.

The billet moving through the coating device and freezer can be propelled by positive drive means adjacent the coating device input but preferably will be propelled by the driven billet behind it. That is to say the front end of a rear driven billet buts up against the rear end of a front billet to drive the latter.

Figure 2:
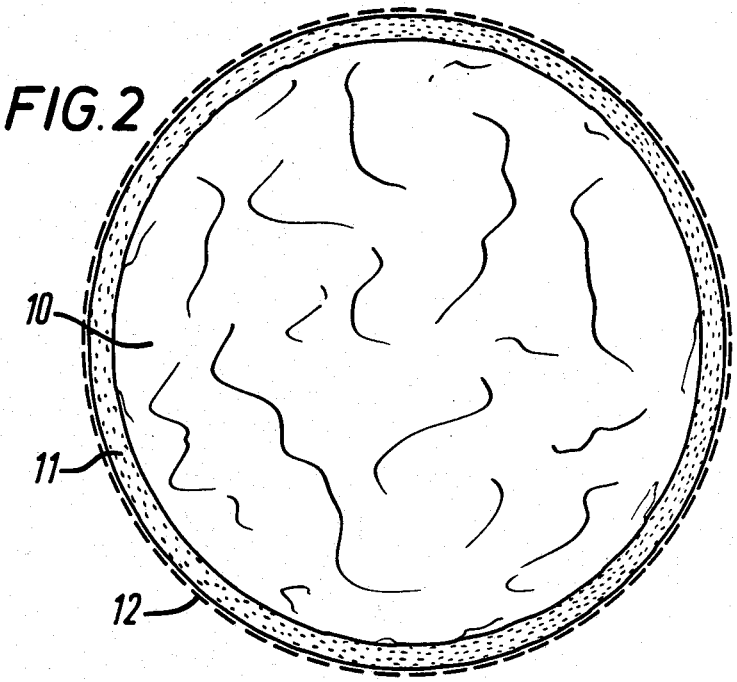
FIG. 2 is a section through a product in accordance with the invention.

A meat-based product in accordance with the invention and produced by the method described above is illustrated, actual size, in FIG. 2. The unfrozen product ready to roast is characterised by a relatively hard and dense core 10 of compacted raw meat, for example turkey, a much less dense outer layer 11 of fat applied by extrusion of a liquid fatty emulsion in the manner set out above and at outer wrapping 12 made of a non-toxic polymer such as a polyester. This wrapping remains on the product during roasting. It will be appreciated that when the product is unfrozen the fat will return to its mobile state and the wrapping 12 is necessary to hold the layer 11 intact and in position. During roasting the fat is, of course, necessary to prevent burning of the meat. The layer of fat thus retained and also by virtue of its manner of application is coherent and even.

Figure 3:
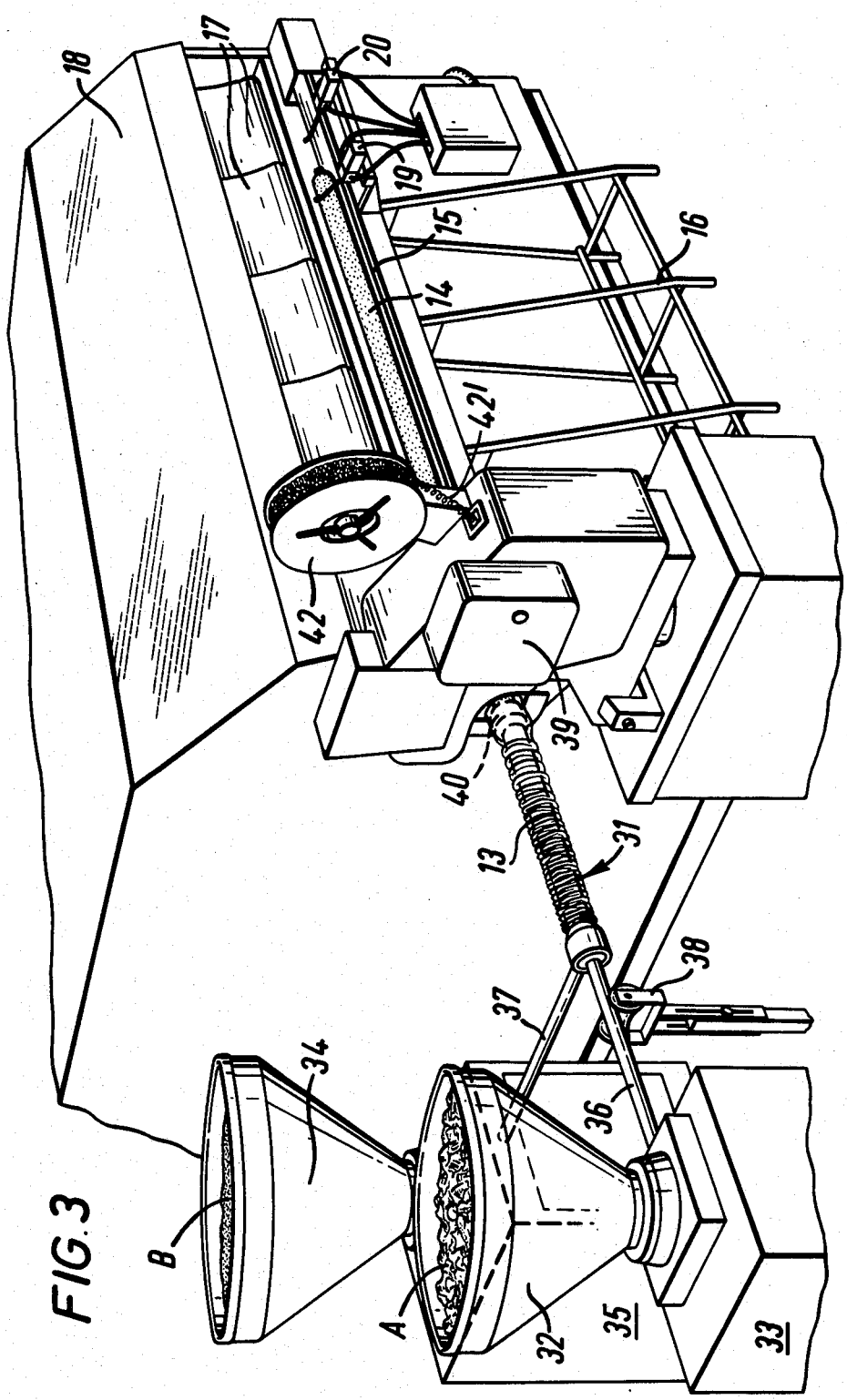
FIG. 3 is a partially schematic elevation view of a second apparatus for putting the present invention into effect.
Figure 8:
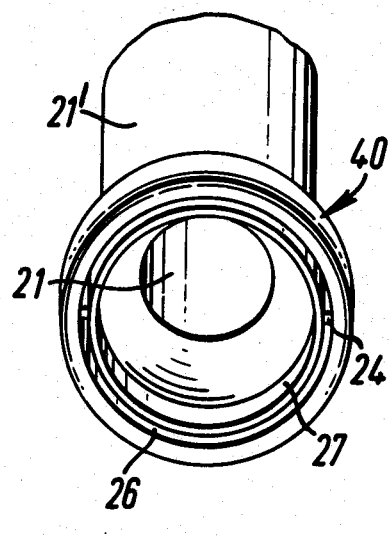
FIG. 8 is an elevation of the extrusion head of the mandrel.
Figure 9:
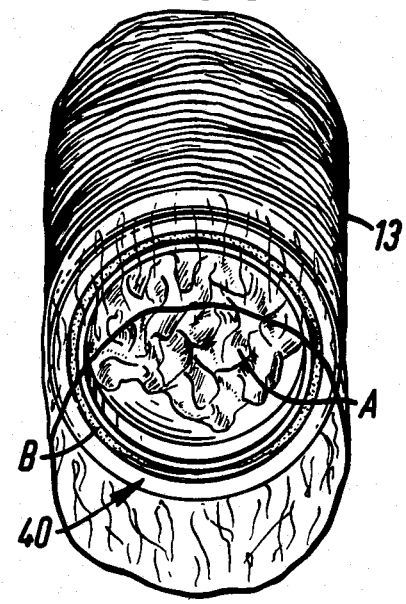
FIG. 9 is a view of the extrusion head with a casing prior to closure and emerging extruded food product.

Referring now to FIG. 3 of the drawings, the second apparatus illustrated comprises an extrusion mandrel 31 fed with turkey or other meat A from a first hopper 32 by a vane pump in housing 33 and with liquified fat material B from a second hopper 34 by a vane pump in housing 35. The meat is raw and deboned and preferably mechanically massaged with salt to produce salt-soluble proteins which enhance the binding properties of the meat. Pipes 36 and 37 extend from the hoppers 32 and 33 respectively to the central passage and the surrounding annulus of mandrel 31 as will be described with reference to FIGS. 4 to 7. Pipe 36 is supported by stand 38. A cutting, closing and clipping apparatus 39 is positioned over the extrusion head 40 of mandrel 31 and has a reel 42 dispensing clipping stock 42'. Thin, approximately 20 micron, tubular casing stock 13 of non-toxic transparent plastic is threaded on to the mandrel 31.

A tiltable track 15 supported on legs 16 receives the elongate cased billet 14 extruded from mandrel 31. Finally discharged billet 14 is tipped sideways through flaps 17 into a freezing tank 18. This tipping and the necessary starting and stopping of the extrusion process, as will be described subsequently with reference to FIGS. 12 and 14, is effected by microswitches 19 and 20.

The detailed construction of the extrusion mandrel 31 will now be described with reference to FIGS. 4 to 6 of the drawings.

The elongate extrusion mandrel 31 has inner and outer concentric sections 21 and 21' of circular cross section. The inner section 21 provides the totally unobstructed passage necessary for the passage of turkey meat A which is solid in consistency often comprising large natural pieces. An axial inlet 25 at the rear end of the inner section 21 allows the entry of this meat from pipe 36 (see FIG. 3). The mandrel outer section or casing 21' defines with the inner section 21 an annular space 22 through which the mobile fluid fat B forming the outer layer of the food product flows. A radially extending pipe 23 at the rear end of the mandrel 31 provides an inlet for the fat from pipe 37 (see FIG. 3).

As can well be seen from the sectional views, vanes 24 connect the inner and outer sections 21 and 21'.

The extrusion head 40 is formed by the laterally enlarged front end part of the mandrel and is seen in section in FIG. 4. The space 22 is constricted here to define an annular frontwardly facing extrusion orifice 26 which is of reduced cross sectional area in comparison to the main length of the space 22 through which the fat flows, which is relatively wide to allow free flow of the fat which, though fluid, may be quite viscous especially in the cool ambient conditions usual in the food industry. The frontwardly facing extrusion orifice 27 of passage 21 is by contrast of enlarged area in comparison to the main length to allow the meat some degree of physical relaxation before it enters its casing.

The operation of the apparatus will now be described with reference to FIGS. 8 to 14 of the drawings.

Figure 10:
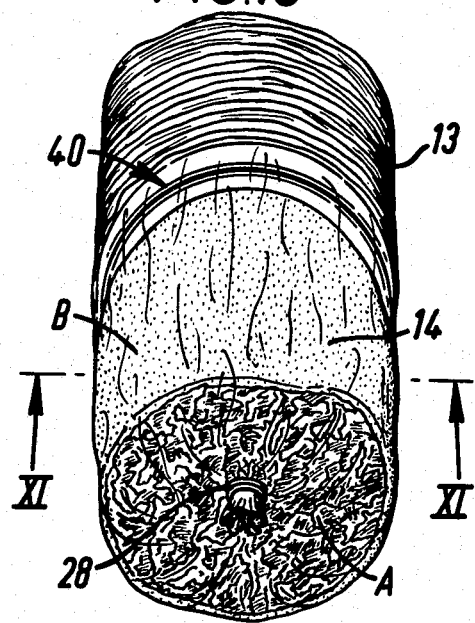
FIG. 10 is a view similar to FIG. 9 showing the meat product having advanced a short distance with the casing closed.
Figure 11:
FIG. 11 is a section of the food product on the line XI—XI of FIG. 10.

The extrusion head 40 of the mandrel 31 is shown empty in FIG. 6. On activation of the extrusion pumps the extrusion product comprising the core of meat A and annular outer layer of fat B advances to the front end of the mandrel 31 into the extrusion head 40. This can be seen in FIG. 9. The tubular casing 13 is pulled forward a short distance by hand from the front end of the mandrel and the apparatus 39 operated to draw the casing 13 around the front of the emerging billet 14 and to secure the casing with a front clip 28. This position is illustrated in FIG. 10 and it will be noted that with the advance under extrusion pressure of the meat and fat the billet end part 29 becomes rounded. It should be noted that the dimensions of the extrusion head, i.e. the diameters of central orifice 27 and the width of annular passage 26 are those of the billet 14 and the ultimate food product, this being a true extrusion. The casing 13 preserves this extruded configuration. FIG. 11 shows the cross section of the billet and the food product in accordance with the invention. This product is generally similar to that of FIG. 2 but is unfrozen and the meat core A has been allowed to relax.

Referring now to FIG. 12 the extruded billet 14 with the closed and rounded front end part 29 leaves the extrusion head 40 and apparatus 39 and travels along the track 15 in the direction x towards the microswitches 19 and 20. When the front end part of the billet 14 contacts and closes the first microswitch 19 extrusion ceases and the apparatus 39 operates to form, close and clip the rear end of the billet 14 and the front end of the billet immediately behind. Thus the enclosed billets are closed at both ends. The billet then resumes its advance driven by means on track 15 to close the second microswitch 20 which operates to tilt the track sideways in the direction of arrows y thereby tipping the billet through flap 17 into freezing tank 18. The billets move transversely of their length through tank 18 and are retrieved frozen for cutting to the desired length and any packaging required.

It should be appreciated that the billet 14 as discharged from the extruder is, in principle, a food product in itself suitable for slicing and cooking. The casing 13 remains on the product right through storage, sale and cooking to the plate. The freezing operation envisaged above could thus be supplemented or replaced by a cooking, smoking or other preparation.

It should be re-emphasised that although the invention has been described by way of example with reference to turkey meat it is applicable to any kind of solid raw meat.

The transparent non-toxic casing stock may be of any suitable "skin" material typically of cellulose, polyamide or polyester. One suitable polyester casing material is sold under the Trade Mark NALOPHAN.

We claim:

1. A meat-based product comprising a compacted constant cross-section core of relatively solid intact natural uncomminuted meat pieces, an even and coherent uniform annular extruded coating of relatively fluid fat material completely surrounding and directly contacting the meat core and adapted to remain on and protect the meat during cooking, and an outer sleeve of flexible non-toxic sheet material retaining said coating on said meat core, said sheet material being adapted to remain on the product during cooking.

2. A product as claimed in claim 1, wherein the fat material is an emulsified material.

3. A product as claimed in claim 1, wherein the meat pieces have been mechanically massaged with salt to enhance the binding properties of the meat.

4. A product as claimed in claim 1, in the form of an elongated round ended billet of substantial length with the sleeve closed at both ends.

5. A product as claimed in claim 1, wherein said product is in the form of a right cylinder.

6. A product as claimed in claim 1, wherein said meat is turkey meat.

7. A product as claimed in claim 1, wherein said product is frozen.

8. A product as claimed in claim 1, wherein said product is smoked.

9. A product as claimed in claim 1, wherein said sheet material is plastic.

10. A product as claimed in claim 9, wherein said plastic is heat-shrinkable.

11. A product as claimed in claim 1, wherein said product, including said meat core, said coating and said sleeve, is sliced.

12. A product as claimed in claim 1, wherein said sleeve is a tubular sleeve.

13. A sliced and cooked meat-based product comprising a compacted constant cross-section core of relatively solid intact natural uncomminuted meat pieces, an even and coherent uniform annular extruded coating of fat completely surrounding and directly contacting the meat core, and an outer annular casing of flexible non-toxic sheet material retaining the coating of fat and being adapted to remain on the product during cooking.

14. A meat-based product comprising a compacted core of intact natural uncomminuted meat pieces, an even and coherent annular extruded outer coating of viscous fatty fluid, and an outer tubular flexible casing over said outer coating said product having been fabricated by coextruding the core and the fat layer in product dimensions into the tubular casing which preserves these dimensions.

15. A product as claimed in claim 14 wherein the core and outer coating are extruded forwardly, in their desired dimensions, from respective orifices in a laterally enlarged extrusion head of an extrusion mandrel, in which the meat core is relaxed, into said casing.

16. A product made by a process comrising the sequential steps of:
  (1) forming raw, relatively solid intact natural meat pieces into a first elongated billet;
  (2) freezing the thus formed first billet solid;
  (3) forming a second elongated frozen billet similar to the first billet;

(4) driving the second frozen billet longitudinally into end-on abutting relationship with the first frozen billet and continuing said driving thereby to longitudinally advance the first frozen billet;

(5) extruding a layer of fluid fat onto the first frozen billet during the longitudinal advance;

(6) sheathing the fat-coated first billet with a protective plastic sleeve adapted to remain on the product during cooking;

(7) superficially freezing the fat-coated, sheathed first billet to freeze the fat coating thereon, the billet being unsupported during the advance past stations at which the extruding, sheathing and superficial freezing steps are carried out; and (8) cutting the thus coated and sheathed frozen first billet into a predetermined length;

to produce a frozen product having a core of large, intact natural meat pieces of substantially constant cross-section, an outer even, coherent and substantially uniform extruded coating of fat completely surrounding and directly contacting the meat, and an overlying plastic sheath adapted to remain on the product during cooking.

17. A product as claimed in claim 16, wherein said first billet is formed by extrusion of said meat pieces directly into a shape-retaining casing, and said shape-retaining casing is stripped from said first billet after said first billet is frozen and before said layer of fat is extruded onto said first frozen billet.

* * * * *